US008903649B2

(12) United States Patent
Radner

(10) Patent No.: US 8,903,649 B2
(45) Date of Patent: Dec. 2, 2014

(54) METHOD AND SYSTEM FOR NAVIGATION

(75) Inventor: Markus Radner, Munich (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/572,052

(22) Filed: Aug. 10, 2012

(65) Prior Publication Data
US 2013/0041582 A1    Feb. 14, 2013

(51) Int. Cl.
G01C 21/36    (2006.01)
G01C 21/34    (2006.01)

(52) U.S. Cl.
CPC ........ G01C 21/3626 (2013.01); G01C 21/3407 (2013.01); G01C 21/3605 (2013.01)
USPC ........................................................ 701/425

(58) Field of Classification Search
USPC ........................................................ 701/425
See application file for complete search history.

(56) References Cited

U.S. PATENT DOCUMENTS

| 5,291,412 | A | | 3/1994 | Tamai et al. | |
|---|---|---|---|---|---|
| 5,508,930 | A | | 4/1996 | Smith, Jr. | |
| 5,938,720 | A | * | 8/1999 | Tamai | 701/533 |
| 6,401,034 | B1 | | 6/2002 | Kaplan et al. | |
| 6,735,515 | B2 | * | 5/2004 | Bechtolsheim et al. | 701/532 |
| 6,812,888 | B2 | * | 11/2004 | Drury et al. | 342/357.31 |
| 2008/0027599 | A1 | * | 1/2008 | Logan et al. | 701/23 |
| 2008/0221787 | A1 | | 9/2008 | Vavrus | |
| 2009/0119003 | A1 | * | 5/2009 | Takeda | 701/200 |
| 2012/0095682 | A1 | * | 4/2012 | Wilson | 701/532 |
| 2012/0158301 | A1 | * | 6/2012 | Schilling et al. | 701/533 |

FOREIGN PATENT DOCUMENTS

| DE | 102004035537 | 3/2006 |
|---|---|---|
| EP | 2068121 | 6/2009 |
| JP | 2004294166 | 10/2004 |

OTHER PUBLICATIONS

European Office Action dated Jun. 27, 2014.

* cited by examiner

*Primary Examiner* — Thomas Tarcza
*Assistant Examiner* — Alex C Dunn
(74) *Attorney, Agent, or Firm* — O'Shea Getz P.C.

(57) ABSTRACT

A method for navigation of a vehicle using a navigation system with stored map data having road segments comprising determining a current road segment and a current position of the vehicle in the current road segment and receiving a user input command. The method determines a destination in the current road segment or in another road segment of a parallel lane of the current road segment, the determining being initiated by the input. A route from the current position to the destination is calculated in the absence of a turn-around maneuver within the current road segment.

8 Claims, 5 Drawing Sheets

US 8,903,649 B2

METHOD AND SYSTEM FOR NAVIGATION

CLAIM OF PRIORITY

This patent application claims priority from EP Application No. 11006605.7 filed Aug. 11, 2011, which is hereby incorporated by reference.

FIELD OF TECHNOLOGY

The present invention relates to the field of navigation systems, and in particular to a navigation system that automatically calculates and provides turn-around directions.

RELATED ART

European Patent EP 2 068 121 B1 discloses a navigation system that provides providing route guidance to a user. The navigation system detects the position of a user for performing route guidance to a destination, which the user has entered into the navigation system. The system detects the current position using for example a GPS receiver in a vehicle, and map data corresponding to an area surrounding the detected position. Generally, a navigation system displays a map image on a display screen and displays a mark indicating the current position of the vehicle or the user, respectively. The navigation system can search for a route with a route processing unit, which calculates a route from a start point to the destination entered by the user. As the current position of the vehicle changes with the movement of the vehicle, the vehicle position mark is moved along the route on the display screen, or a map image adjacent to the vehicle is scrolled while the vehicle position mark persists at a predetermined point on the display screen. When the vehicle approaches a determined maneuver point on the route at which the user is required to make a maneuver from a movement in a current direction (e.g., when changing a road on which the user is currently travelling), the route processing unit provides information to the user regarding the route which indicates the maneuver point (e.g., indicates that the user has to leave the road on which the user is currently travelling). For example, the display screen shows an arrow which indicates the direction the user has to take at the maneuver point, for example indicating that the user has to leave the highway on which the user is travelling at the next exit on the right. As an alternative or additionally, the navigation system may also indicate the maneuver point to the user by voice output.

EP 2 068 121 B1 shows the navigation system that comprises a route processing unit that calculates a first route to a destination and provides information to the user regarding the first route. The navigation system determines at least one maneuver point at which the user is required to make a maneuver from a movement in a first direction to a movement in a second direction. The navigation system comprises a deceleration calculating unit that receives information regarding the at least one maneuver point, and calculates a deceleration value required for the user to make the maneuver. The deceleration calculating unit determines whether the deceleration value exceeds a predetermined reference value. The route processing unit calculates a second route to the destination as an alternative to the first route, wherein according to the second route the user is not required at the maneuver point to make the maneuver.

PCT Publication WO 2008/112335 A1 discloses an apparatus and method for determining a suggested route having an estimated minimum fuel usage. For example, the route determiner uses the speed limit of a segment plus 10 miles per hour for the estimated speed in calculating the estimated amount of fuel that will be used.

There is a need for a system and method that provides improved user situational awareness providing turn around guidance to the user.

SUMMARY OF THE INVENTION

A method for navigation of a vehicle by a navigation system with stored map data having road segments is provided. In the method, a current road segment and a current position in the current road segment may be determined. The current road segment may be associated with the current position. The current road segment may be determined from the stored map data by comparing the current position and a predefined position range of the road segment. The current road segment associated with the current position may be determined from locally saved map data. A road segment may be defined for example between two points in the map data.

A user input command may be received by the navigation system. The input may occur manually, such as for example by a button or touchscreen or via a voice command by speech recognition.

A destination in the current road segment or in another road segment of a parallel lane of the current road segment may be determined. The determination may be initiated by the user input command or the determination may occur automatically without a further input. Input of an address of the destination by the user is not necessary.

A route from the current position to the destination may be calculated without a turn-around maneuver within the current road segment. Route guidance may be started after the route is calculated. The route guidance may be started immediately, i.e., without additional input by the user.

A system for navigation is provided. The system may have an input unit for receiving an input by the user. The system may have an arithmetic logic unit that communicates with a database having stored map data with road segments.

The arithmetic logic unit may be configured to calculate a route to a destination based on the input.

The arithmetic logic unit may determine a current road segment and a current position in the current road segment. The current road segment may be associated with the current position.

The arithmetic logic unit may be configured to determine the destination in the current road segment or in another road segment of a parallel lane of the current road segment. The determination of the destination may be initiated by the input.

The arithmetic logic unit may calculate the route from the current position to the destination without a turn-around maneuver within the current road segment.

The arithmetic logic unit may be configured to start a route guidance. The route guidance may be done by maneuver instructions, e.g., showing the route on a display unit.

The destination may be calculated by adding an offset to the current position. In one embodiment the offset may be added in opposite to the driving direction or facing the parallel lane, respectively.

Instead of the turn-around maneuver, only left turns and right turns may be allowed. As a result, it is possible for the driver to make the most rapid reversal of the driving direction, when the turn-around maneuver is not possible, for example, because of high traffic volume.

In one embodiment the route may be changed by the user input command. In one embodiment the route may be selected from calculated different routes by the input. One of several calculated routes may be selected. A selection between different routes can be made by successive button actuations.

In one embodiment, the route may be changed in that a driving maneuver is allowed or not allowed for calculating the route by the input. The driving maneuver may be "turn around". In a first actuation of the input a turn-around may be allowed, whereas in a second actuation of the input the turn-around may be not allowed, so that a calculated first route may be associated with the first actuation and a calculated second route may be associated with the second actuation.

In one embodiment the user input command may occur for example by one input step or precisely two input steps. Because of the relatively few input steps, distraction of the driver from the traffic situation is reduced. The input may be achieved by a single button input or a single voice command. Alternatively, the input may be achieved by opening the main menu as a first input step and selecting the function as a second input step, whereby the function in the main menu may have to be executed immediately.

In one embodiment, a first direction of a vehicle motion within the current road segment may be determined. The first direction may be defined as the direction from point A to point B in the map data or as a cardinal direction. The direction may be specified based on a plurality of determined positions.

In one embodiment the input may be associated with a second direction. The second direction may be determined based on the first direction and may be determined based on the map data. The second direction may be defined between two points A, B in the map data or as a cardinal direction.

In one embodiment the second direction and the first direction may be different. The first direction and the second direction may differ from one another in an obtuse angle. The destination may be determined based on both, the current position and the second direction.

In one embodiment the arithmetic logic unit may be configured to determine the second direction based on the first direction and optionally based on the map data. The second direction may be set opposite to the first direction, when the road segment is not a one-way street.

In one embodiment the first direction of the vehicle's motion within the current road segment may be determined. The second direction may be set opposite to the first direction, when the road segment is not a one-way street, based on the input. The second direction may correspond to the first direction, when the road segment is a one-way street.

In one embodiment, the determining of the destination may be deactivated or an information item is output when the current road segment is a one-way street. The output may be an audible warning signal or an audible descriptive text, if the street is a one-way street, so that turning around in the street is not possible. The output can also be visual, for example, as a blinking direction arrow.

All embodiments may be combined with each other. Some possible combinations are explained in the description of the drawings. These depicted combinations of possible refinement variants are not definitive, however.

These and other objects, features and advantages of the present invention will become apparent in light of the detailed description of the best mode embodiment thereof; as illustrated in the accompanying drawings. In the figures, like reference numerals designate corresponding parts.

DETAILED DESCRIPTION OF THE INVENTION

Figure 1A:
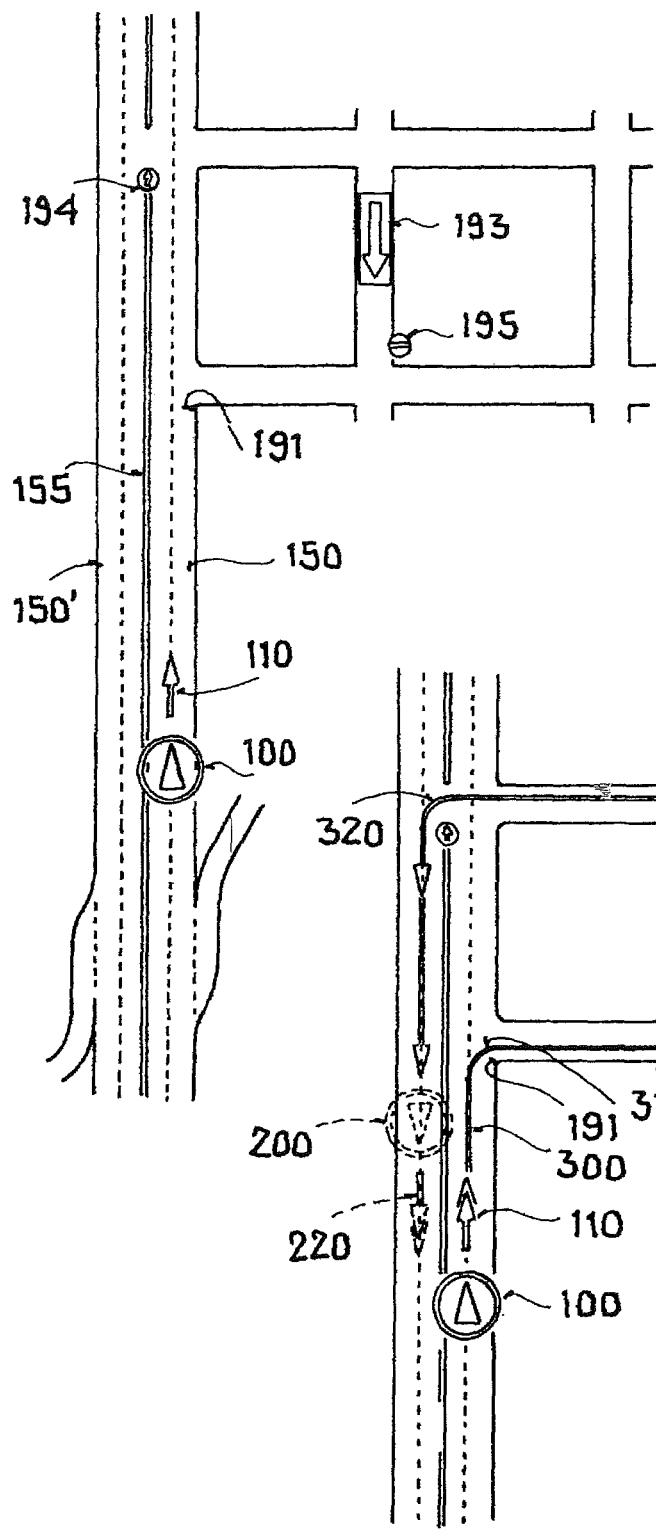
FIG. 1a is a pictorial illustration of a section of a city map.

Referring to FIG. 1a, when a driver attempts to reach a destination without the aid of a navigation system, no route is initially calculated by the navigation system. The navigation system in the on-mode nevertheless can determine a current position 100, a current direction 110, and a current road segment 150 in which the vehicle is currently located. The driver can find himself in a situation in which he wishes to turn around. For example, the driver has passed the exit on the city highway. Because turning around on main roads may often be difficult, when, e.g., a road barrier divides two lanes, support of the driver by the navigation system would be advantageous.

This type of situation is shown schematically in FIG. 1a by a road map detail. The vehicle may be located at the current position 100 and may currently be driving in the first direction 110. The first driving direction 110 may be permitted in the lane in which the vehicle is located according to traffic rules. Turning around within the current traveled lane itself may not be possible, however, because there may be traffic in the opposite direction in a parallel lane. In FIG. 1, both lanes are separated from one another by a central crash barrier 155. If the driver has no knowledge of the area, he may need to make a long detour to reach the correct exit again. To input a destination manually, the driver would need to know the destination, stop, and enter the destination address.

The navigation system may have stored map data. In one embodiment of FIG. 1a, current road segment 150 and road segment 150' of the opposite direction, junction 191, one-way street 193, and restrictions by traffic controls 194, 195 may be stored. The other road segment 150' may be a parallel lane of the current road segment 150, where the current position 100 is located in. According to the map data the navigation system may know that the traffic control "go straight" 194 does not permit a turn-around.

Figure 1B:
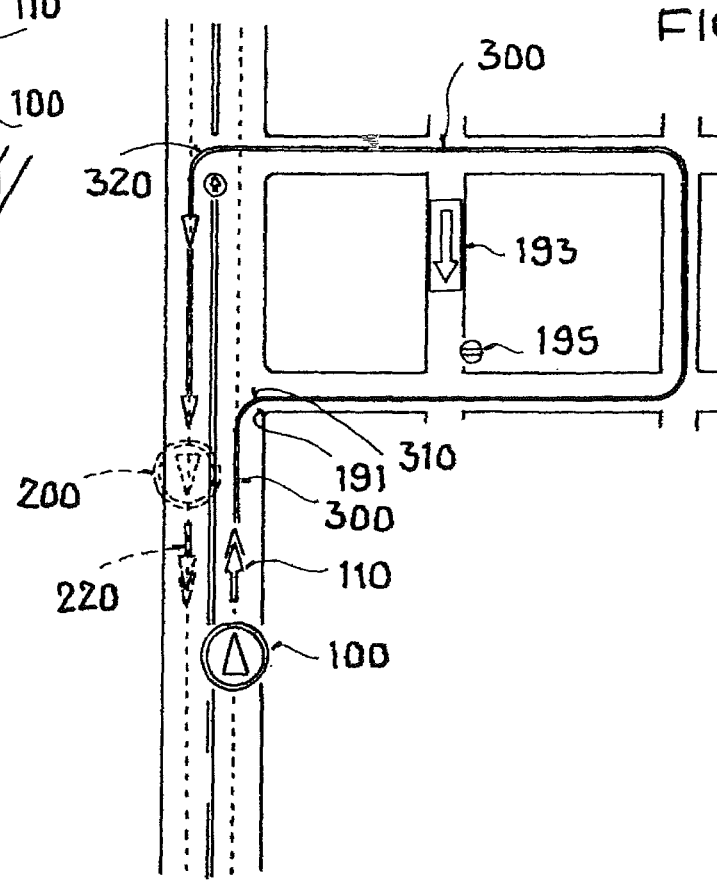
FIG. 1b is a pictorial illustration of the section of the city map with a calculated route of an exemplary embodiment.

In one embodiment of FIG. 1b, a short route 300 may calculated by the navigation system. The short route 300 in the exemplary embodiment of FIG. 1b may produce a turning around in a second direction 220, which deviates from the current first direction 110. The current position 100 of the vehicle may be determined continuously on the basis for example of satellite signals. The road segment 150 associated with the current position 100 may be determined by the navigation unit from map data. In addition, the first direction 110 of the vehicle's motion within the road segment 150 may be determined.

The driver may provide an input associated with the second direction 220. For example, the input may be designated as "turn around," so that the driver by the input "turn around" initiates a calculation of the short route 300. Initiated by the input "turn around," a destination 200 may be determined. The destination 200 may also be regarded as target position. The destination 200 may be based only on the current position 100 and the second direction 220 associated with the input "turn around". One embodiment of FIG. 1b achieves the advantage that the driver need not define the destination 200 manually by a time-consuming input of an address, which is inconvenient and dangerous while driving, because the driver's attention is distracted from the traffic. In contrast, a new convenience function may be achieved by one embodiment of FIG. 1b in that the destination 200 with the second driving direction 220 and the short route 300 may be calculated ad hoc for the current position 100 and the current first driving direction 110. After the short route is calculated, the route guidance may be started automatically. If the driver deviates from the short route 300, the short route 300 may be recalculated, which also has the reversal of the driving direction proceeding from the original position 100; i.e., the destination 200 may be retained.

In this regard, the function for automatic destination calculation is not limited to the special case shown in FIG. 1b. By the navigation system, a search for the next opportunity for turning around on the street may be made or a short route may be calculated, which describes a loop, such as, e.g., turn right->turn left repeatedly->optionally turn right once again.

Figure 2:
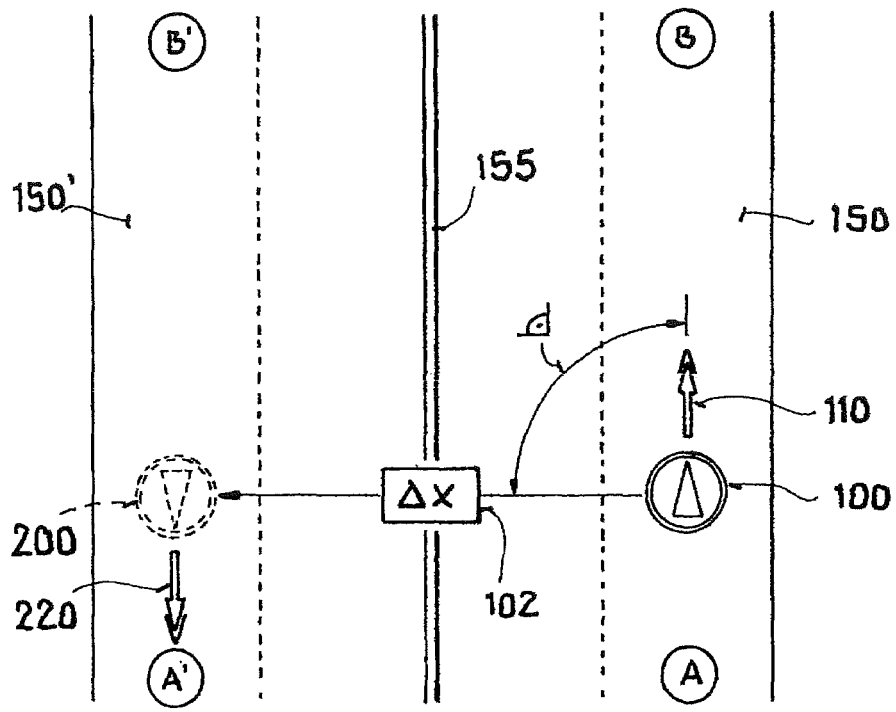
FIG. 2 is a pictorial illustration that shows calculating a destination of an exemplary embodiment.

In one embodiment shown schematically in FIG. 2 the destination 200 may be determined, when the current position 100 of the vehicle is on the road segment 150 of a highway from node A to B. The vehicle in this case may proceed from A to B in the first direction 110. A parallel lane is shown, which is separated from the current road segment 150 by the barrier 155. The parallel lane may be another road segment 150' extending from node B' to node A'. Both parallel segments 150, 150' may be one-way streets. The destination 200 may be determined at the intersection with the other road segment 150' between the node B' and A' drawing a line from the current position 100, which deviates from the first direction 110 at an angle, in one embodiment of FIG. 2 of 90°. The destination 200 may be determined on the adjacent lane with the opposite second driving direction 220. The destination 200 may be determined computationally by shifting the current position 100 by the segment Δx along line 102. Next, the destination 200 may be shifted computationally between nodes B' and A' optionally. The destination 200 may be shifted by a constant offset along road segment 150'.

Figure 3:
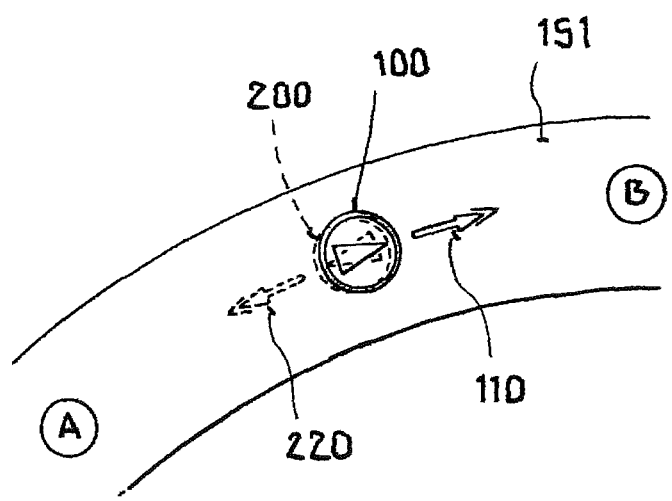
FIG. 3 is a pictorial illustration that shows calculating a destination of another exemplary embodiment.

One embodiment for the automatic determination of the destination 200 is shown schematically in FIG. 3. The vehicle may be in the current position 100 with the current first driving direction 110 from node A to node B. In one embodiment of FIG. 3, the destination 200 may be equivalent to the current position 100. In contrast, the second direction 220 associated with the destination 200 may be set opposite to the first direction 110 associated with the current position 100. For this purpose, the first direction 110 may be inverted, for example, and optionally adjusted to a course in the road segment 151, so that the first direction 110 and the second direction 220 are not necessarily aligned.

After the destination 200 and the second direction 220 are determined, the route may be calculated. For example, in the exemplary embodiment of FIG. 3, a maneuver instruction for a turn-around maneuver at the next possible place in the road segment 151 may output via a screen or as an audible voice instruction. Often, owing to a high traffic volume, a turn-around maneuver may not be possible, however, because the oncoming traffic may actually not allow turning around. In one embodiment of FIG. 3, the route may be changed by a driver input. The input may be made by a user operated button. The route may then be changed by another actuation of the button. This can also occur repeatedly, so that the driver can step through different routes. The route may be displayed on the screen. For example, the route may be changed in that a driving maneuver, e.g., "please turn around," is allowed or not allowed for calculating the route by the input. In the aforementioned example, because of the relatively heavy traffic, the driving maneuver "turn around" may not be allowed and the route may be calculated without this driving maneuver, in that instead of turning around a left and/or right turn may be made.

Figure 4A:
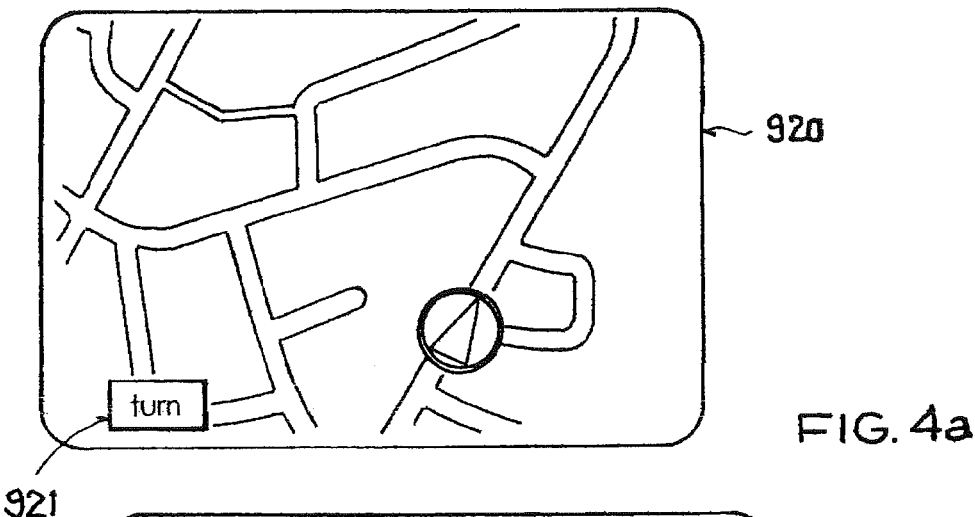
FIG. 4a illustrates a touch-sensitive display of a navigation system.
Figure 4B:
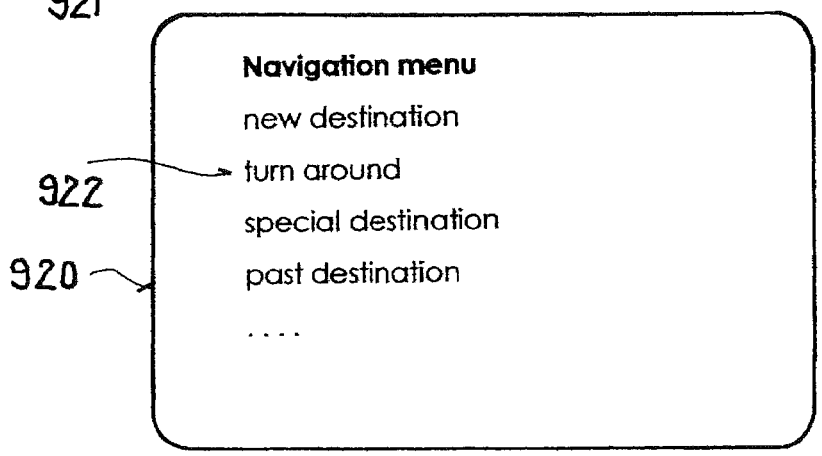
FIG. 4b illustrates the touch-sensitive display of the navigation system configured to display certain selectable user command options.
Figure 4C:
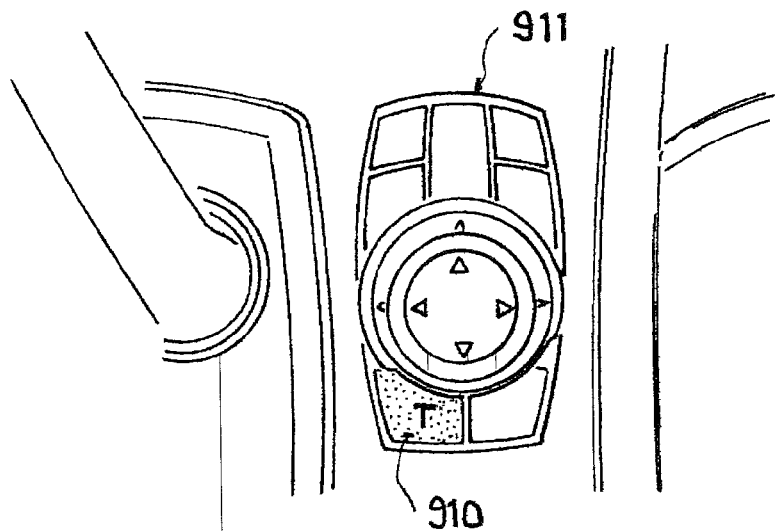
FIG. 4c shows a schematic view of an input unit.
Figure 4:
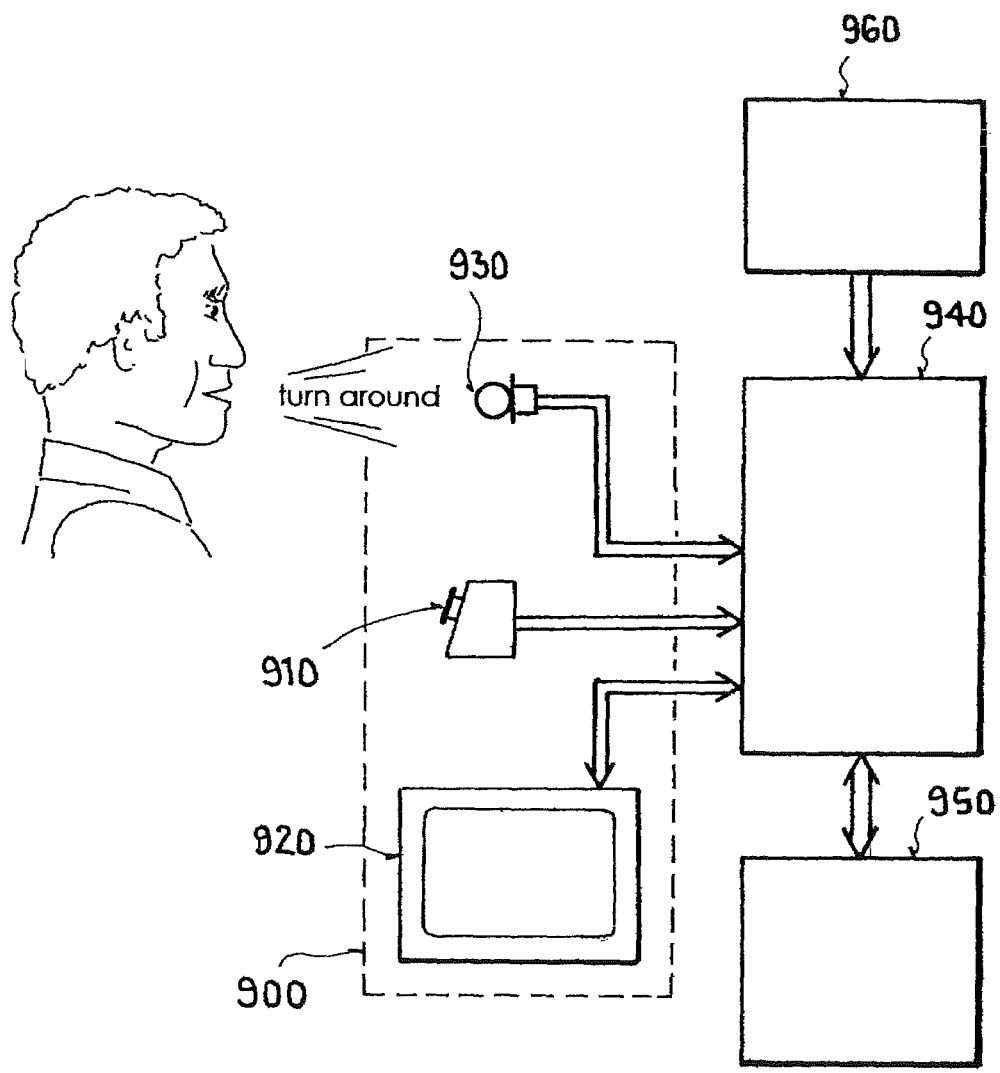
FIG. 4 is a schematic block diagram illustration of a navigation system.

FIG. 4 illustrates a navigation system with an input unit 900, an arithmetic logic unit 940, a database 950, and a receiver 960. Satellite signals may be received by the receiver and the current position 100 may be determined from the satellite signals. The input unit 900 of one embodiment of FIG. 4 may provide three input options. Input unit 900 may have a button 910, which may be associated with initiating the function of automatically calculating destination 200. Actuation of the button 910 may be the input that leads to the calculation of the destination 200. The input unit 900 may have a voice recognition device 930, which may recognize a phrase as input, which may be associated with the function of automatically calculating the destination 200. In one embodiment of FIG. 4, the phrase "turn around" may be assigned to the function.

The input unit 900 of one embodiment of FIG. 4 may have a screen 920 with a touch-sensitive surface (touchscreen 920). As shown in the exemplary embodiment of FIG. 4a, an icon 921 shown on the touchscreen 920, which may be in the form of a widget, may be associated with the input of the function for automatically calculating destination 200. Another option for input using the touchscreen 920 is shown schematically in FIG. 4b. In the main menu, the function for automatically calculating the destination 200 by selecting a special menu entry 922 can be input by the driver.

In one embodiment of FIG. 4a, the function may be input by one input step. In contrast, in the exemplary embodiment of FIG. 4b, the function may be input by two input steps, namely by activating the main menu "navigation menu" and by touching menu entry 922 "turn around." The function is relatively simple and rapid to achieve for the driver by this control concept. Safety for the driver is therefore increased with the improved situational awareness and stress is reduced, because he is not distracted from the traffic situation by the short input with for example two input steps. In addition, an opportunity for turning around, which conforms to traffic rules, is quickly created for the driver. This function may produce a route that provides in particular the shortest path to the next turn-around opportunity. The route can thereby comprise turning right into side streets, when the next left-turn opportunity is too far away.

An example of a special button 910 in an input unit 911 in a center console of a vehicle is shown schematically in FIG. 4c. The function of turning around may be visualized by a symbol or a letter or text on the button. The function for the automatic destination calculation can be achieved by the driver quickly and easily by a input by embodiments shown in FIGS. 4 to 4c. Thus, the input can occur much more rapidly than an input of a destination address.

Figure 5:
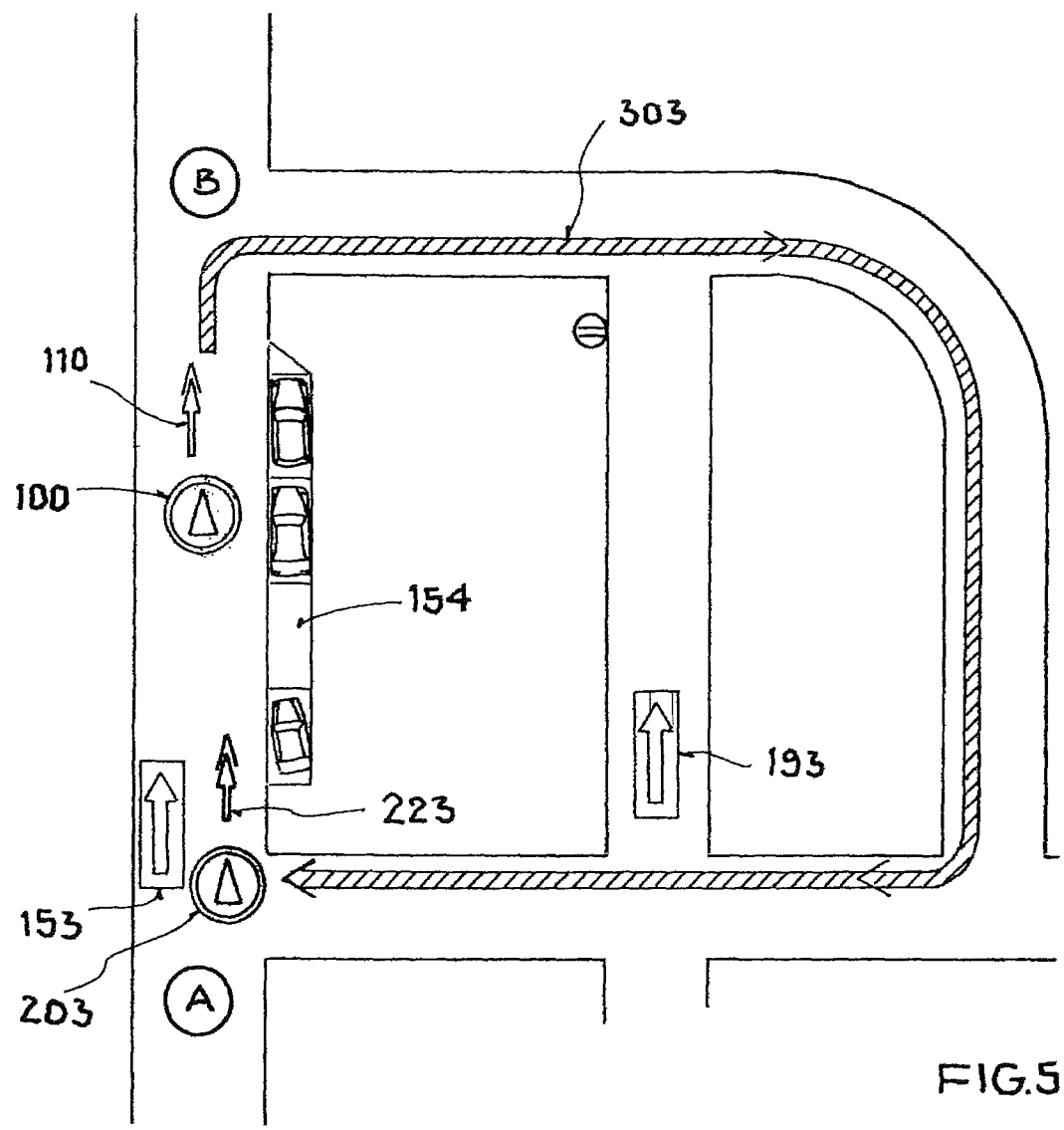
FIG. 5 is a pictorial illustration for calculating a destination and a route of another exemplary embodiment.

One embodiment is shown schematically in FIG. 5. If the current position 100 of the vehicle is located in a road segment 153 of a one-way street 153, a turn-around may not be permitted. In this case the turn-around icon 921 in FIG. 4a or the menu item 922 in the main menu of the embodiment of FIG. 4b may be greyed out. If the button 910 is nevertheless pressed, a suitable instruction may be output e.g., announcing that a turn-around is not permitted.

In one embodiment of FIG. 5 the driver searches for a parking space 154 and may have just driven past parking space 154, so that from the current position 100 it may not be possible to turn-around to reach the parking space 154. In this case the driver wants to drive through the one-way street 153 again from its beginning. Hence a function may be provided guiding the driver to the beginning of the one-way street 153. Initiated by an input associated with a function e.g., "get back to the beginning of the one-way street" a destination 203 may be determined. The destination 203 may be determined based on the current position 100 and map data, e.g., by estimating the destination 203 being at the first intersection of the one-way street 153. In this case a second direction 223 may be based on the map data and may be equal to the only permitted direction of the one way street. After determining the destination 203 a route 303 from the current position 100 to the destination 203 may be calculated as shown in FIG. 5, so that the route guidance may allow the driver to reach parking space 154 again for parking.

The invention is not limited to the shown embodiment variants of FIGS. 1a through 5. For example, it is possible to provide a different input or other conditions for route calculation. The functionality of FIG. 1b can be used especially advantageously for a navigation system of a motor vehicle.

Although the present invention has been illustrated and described with respect to several preferred embodiments thereof, various changes, omissions and additions to the form and detail thereof, may be made therein, without departing from the spirit and scope of the invention.

What is claimed is:

1. A method for navigation of a vehicle using a navigation system with stored map data having road segments comprising the steps:
   determining a current road segment and a current position of the vehicle in the current road segment;
   receiving a user input command;
   automatically determining a destination in an opposite direction travel lane in the current road segment or in another road segment of a parallel travel lane of the current road segment based on the current position of the vehicle without inputting an address of the destination, wherein the destination is calculated by adding an offset to the current position, the determining being initiated by the user input command; and
   calculating a route from the current position to the destination in the absence of a turn-around maneuver within the current road segment.

2. The method of claim 1, wherein the route is selected from calculated different routes by the input.

3. The method of claim 1, wherein the route is changed, in that a driving maneuver is allowed or not allowed by the input for calculating the route.

4. The method of claim 1, wherein the step of receiving includes receiving up to two input commands.

5. The method of claim 1,
   wherein a first direction of the vehicle's motion within the current road segment is determined;
   wherein the input is associated with a second direction; and
   wherein the second direction and the first direction are different.

6. A method for navigation of a vehicle using a navigation system with stored map data having road segments comprising the steps:
   determining a current road segment and a current position of the vehicle in the current road segment;
   receiving a user input command;
   determining a destination in the current road segment or in another road segment of a parallel lane of the current road segment, the determining being initiated by the input; and
   calculating a route from the current position to the destination in the absence of a turn-around maneuver within the current road segment,
   wherein a first direction of the vehicle's motion within the current road segment is determined;
   wherein the input command is associated with a second direction; and
   wherein the second direction is set opposite to the first direction, when the current road segment is not a one-way street, and the second direction is set corresponding to the first direction, when the current road segment is a one-way street.

7. A method for navigation of a vehicle using a navigation system with stored map data having road segments comprising the steps:
   determining a current road segment and a current position of the vehicle in the current road segment;
   receiving a user input command;
   determining a destination in the current road segment or in another road segment of a parallel lane of the current road segment, the determining being initiated by the input; and
   calculating a route from the current position to the destination in the absence of a turn-around maneuver within the current road segment,
   wherein the step of determining of the destination is deactivated or an information item is output, when the current road segment is a one-way street.

8. A system for navigation, comprising:
   an input unit that receives user input commands;
   an arithmetic logic unit connectable to a data base having stored map data with road segments;
   wherein the arithmetic logic unit calculates a route to a destination based on the input command,
   wherein the arithmetic logic unit determines a current road segment and a current position of the vehicle in the current road segment;
   wherein the arithmetic logic unit automatically determines the destination in the current road segment or in another road segment of a parallel lane of the current road segment based on the current position of the vehicle without inputting an address of the destination, wherein the destination is calculated by adding an offset to the current position, where the destination is located in a vehicle travel lane for travel in an opposite direction from a vehicle travel direction associated with the current position; and
   wherein the arithmetic logic unit calculates the route from the current position to the destination without a turn-around maneuver within the current road segment.

* * * * *